US012558193B2

(12) United States Patent
  Kopelman et al.

(10) Patent No.:  US 12,558,193 B2
(45) Date of Patent:  Feb. 24, 2026

(54) METHODS FOR FABRICATING LAYERED APPLIANCES

(71) Applicant: Align Technology, Inc., San Jose, CA (US)

(72) Inventors: Avi Kopelman, Palo Alto, CA (US); Jeeyoung Choi, Sunnyvale, CA (US)

(73) Assignee: Align Technology, Inc., San Jose, CA (US)

( * ) Notice: Subject to any disclaimer, the term of this patent is extended or adjusted under 35 U.S.C. 154(b) by 105 days.

(21) Appl. No.: 18/359,216

(22) Filed: Jul. 26, 2023

(65) Prior Publication Data
  US 2023/0363862 A1  Nov. 16, 2023

Related U.S. Application Data

(63) Continuation of application No. 17/508,880, filed on Oct. 22, 2021, now Pat. No. 11,751,978, which is a continuation of application No. 14/610,060, filed on Jan. 30, 2015, now Pat. No. 11,154,382.

(60) Provisional application No. 62/015,170, filed on Jun. 20, 2014.

(51) Int. Cl.
  *A61C 7/08*  (2006.01)
  *A61C 7/00*  (2006.01)
(52) U.S. Cl.
  CPC .............. *A61C 7/08* (2013.01); *A61C 7/002* (2013.01); *Y10T 29/4957* (2015.01); *Y10T 83/04* (2015.04); *Y10T 83/0586* (2015.04)
(58) Field of Classification Search
  CPC ....... A61C 7/08; A61C 7/002; Y10T 29/4957; Y10T 83/04; Y10T 83/0586
  See application file for complete search history.

(56) References Cited

U.S. PATENT DOCUMENTS

| | | | |
|---|---|---|---|
| 11,331,166 | B2 | 5/2022 | Morton et al. |
| 11,344,385 | B2 | 5/2022 | Morton et al. |
| 11,376,101 | B2 | 7/2022 | Sato et al. |
| 11,419,702 | B2 | 8/2022 | Sato et al. |
| 11,419,710 | B2 | 8/2022 | Mason et al. |
| 11,471,253 | B2 | 10/2022 | Venkatasanthanam et al. |
| 11,497,586 | B2 | 11/2022 | Kopelman |
| 11,504,214 | B2 | 11/2022 | Wu et al. |
| 11,523,881 | B2 | 12/2022 | Wang et al. |
| 11,534,268 | B2 | 12/2022 | Li et al. |

(Continued)

FOREIGN PATENT DOCUMENTS

| | | |
|---|---|---|
| CN | 2572927 Y | 9/2003 |
| CN | 1454573 A | 11/2003 |

(Continued)

*Primary Examiner* — Eric J Rosen
*Assistant Examiner* — Hao D Mai
(74) *Attorney, Agent, or Firm* — FORTEM IP LLP

(57) ABSTRACT

Methods for fabricating layered appliances are provided. In some embodiments, a method includes generating a digital model of a polymeric shell including a plurality of tooth-receiving cavities shaped to receive and reposition a patient's teeth from a first arrangement toward a second arrangement. The polymeric shell can include an interior layer having a first stiffness, and an exterior layer having a second stiffness greater than the first stiffness. The exterior layer can include a discontinuity formed therein. The method can further include transmitting the digital model to a fabrication system configured to fabricate the polymeric shell based on the digital model.

29 Claims, 10 Drawing Sheets

(56)     References Cited

U.S. PATENT DOCUMENTS

| | | | |
|---|---|---|---|
| 11,534,974 | B2 | 12/2022 | O'Leary et al. |
| 11,554,000 | B2 | 1/2023 | Webber |
| 11,564,777 | B2 | 1/2023 | Kopelman et al. |
| 11,571,279 | B2 | 2/2023 | Wang et al. |
| 11,576,752 | B2 | 2/2023 | Morton et al. |
| 11,589,955 | B2 | 2/2023 | Medvinskaya et al. |
| 11,596,502 | B2 | 3/2023 | Webber et al. |
| 11,602,414 | B2 | 3/2023 | Sato et al. |
| 11,642,194 | B2 | 5/2023 | Boronkay et al. |
| 11,642,198 | B2 | 5/2023 | Kopelman et al. |
| 2006/0194163 | A1 | 8/2006 | Tricca et al. |
| 2013/0029283 | A1 | 1/2013 | Matty |
| 2013/0122447 | A1 | 5/2013 | Lemchen |
| 2018/0333226 | A1 | 11/2018 | Tsai et al. |
| 2019/0090984 | A1 | 3/2019 | Martz et al. |
| 2020/0015937 | A1 | 1/2020 | Stewart |
| 2021/0153978 | A1 | 5/2021 | Parkar et al. |
| 2022/0031426 | A1 | 2/2022 | Sato et al. |

FOREIGN PATENT DOCUMENTS

| | | | |
|---|---|---|---|
| CN | 101951854 | A | 1/2011 |
| EP | 2813193 | B1 | 6/2017 |

Apply a first orthodontic appliance to a patient's teeth to reposition the teeth from a first tooth arrangement to a second tooth arrangement
210

Apply a second orthodontic appliance to the patient's teeth to reposition the teeth from the second tooth arrangement to a third tooth arrangement
220

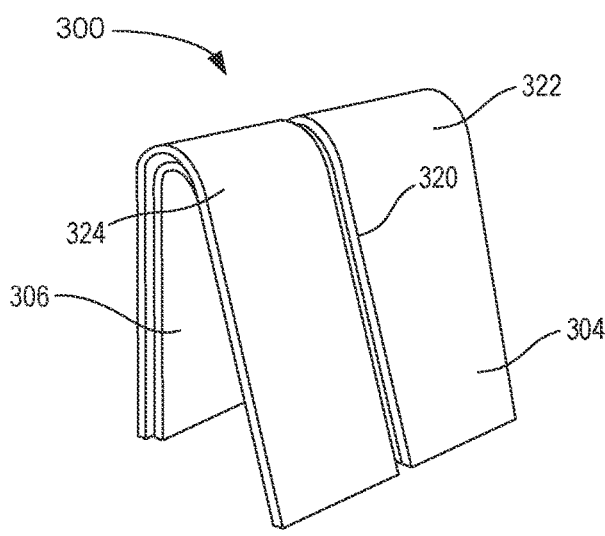
FIG. 3D
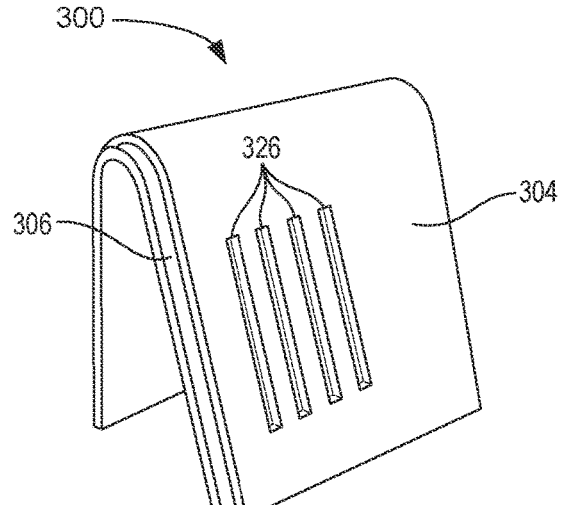
FIG. 3E
FIG. 3F

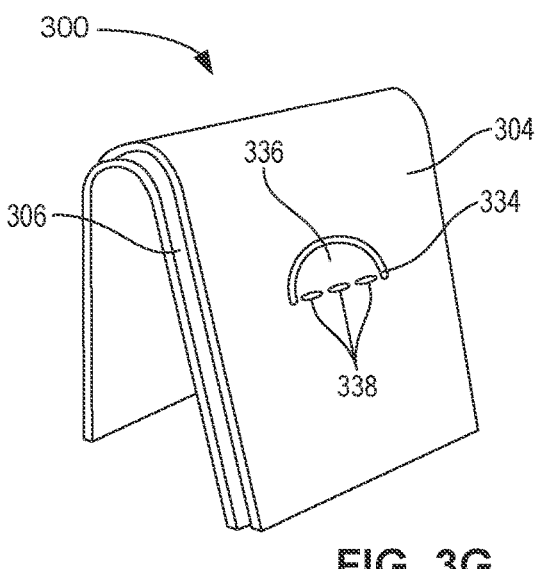
FIG. 3G
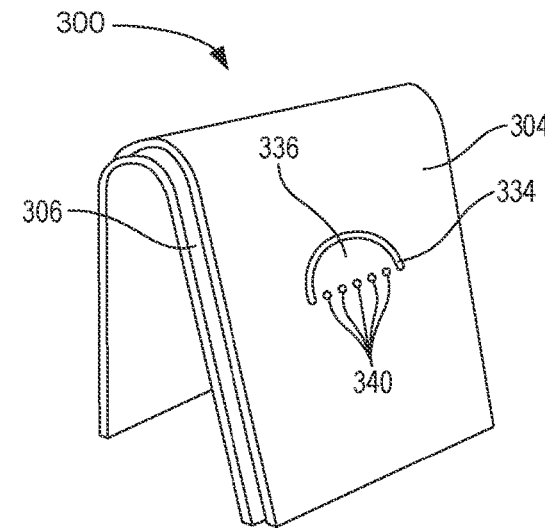
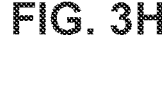
FIG. 3H
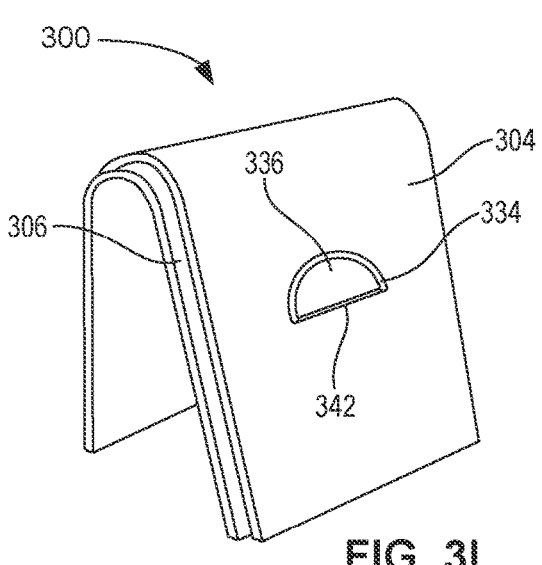
FIG. 3I

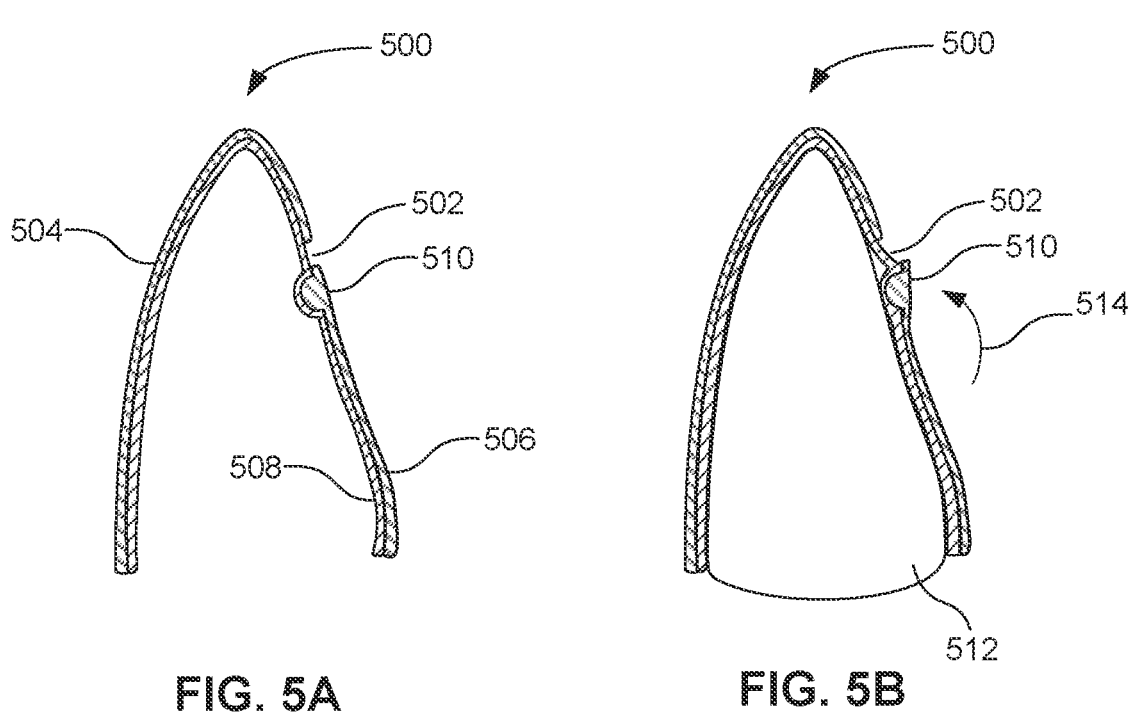
FIG. 5A                     FIG. 5B
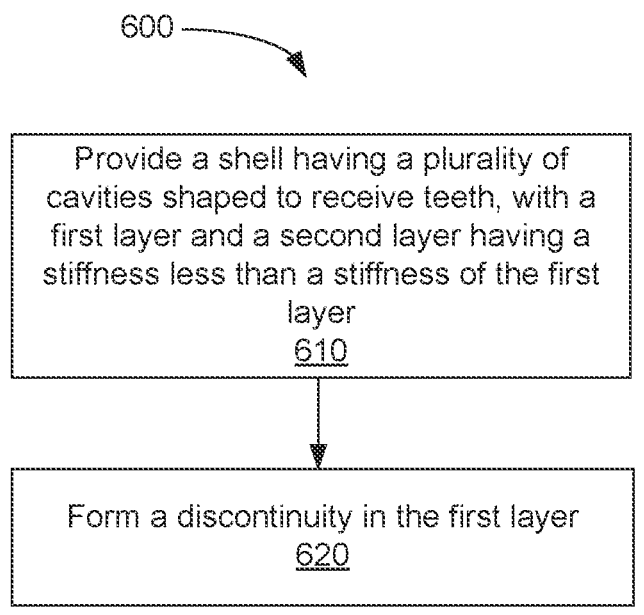
Provide a shell having a plurality of cavities shaped to receive teeth, with a first layer and a second layer having a stiffness less than a stiffness of the first layer
610
Form a discontinuity in the first layer
620
FIG. 6

1

METHODS FOR FABRICATING LAYERED APPLIANCES

CROSS-REFERENCE TO RELATED APPLICATIONS

This application is a continuation of U.S. patent application Ser. No. 17/508,880, filed Oct. 22, 2021, which is a continuation of U.S. patent application Ser. No. 14/610,060, filed Jan. 30, 2015, now U.S. Pat. No. 11,154,382, issued Oct. 26, 2021, which claims the benefit of U.S. Provisional Application No. 62/015,170, filed Jun. 20, 2014, each of which applications are incorporated herein by reference in their entireties.

BACKGROUND

Orthodontic procedures typically involve repositioning a patient's teeth to a desired arrangement in order to correct malocclusions and/or improve aesthetics. To achieve these objectives, orthodontic appliances such as braces, retainers, shell aligners, and the like can be applied to the patient's teeth by an orthodontic practitioner. The appliance is con-figured to exert force on one or more teeth in order to effect desired tooth movements. The application of force can be periodically adjusted by the practitioner (e.g., by altering the appliance or using different types of appliances) in order to incrementally reposition the teeth to a desired arrangement.

In some instances, however, current orthodontic appliances may not be able to effectively generate the forces needed to achieve the desired tooth repositioning or may not afford sufficient control over the forces applied to the teeth. The prior orthodontic approaches may often employ a single appliance shell with homogeneous and/or continuous mate-rial properties, which can provide less than ideal movement and comfort. Additionally, the rigidity of some existing appliances may interfere with the ability of the appliance to be coupled to the patient's teeth and may increase patient discomfort.

SUMMARY

Improved orthodontic appliances, as well as related sys-tems and methods, are provided. An orthodontic appliance can include a shell having an exterior layer and an interior layer, with the exterior layer having a greater stiffness than the interior layer. A discontinuity can be formed in the exterior layer. When placed on a patient's teeth, the inter-action of the interior layer with the discontinuity can exert forces on the underlying teeth to elicit one or more desired tooth movements. The appliances described herein may provide enhanced control over forces exerted onto the teeth, thus enabling improved orthodontic treatment procedures.

Accordingly, in one aspect, an orthodontic appliance can include a shell having a plurality of cavities shaped to receive a patient's teeth. The shell can include an exterior layer and an interior layer having a stiffness less than that of the exterior layer. A discontinuity can be formed in the exterior layer.

Other objects and features of the present invention will become apparent by a review of the specification, claims, and appended figures.

INCORPORATION BY REFERENCE

All publications, patents, and patent applications men-tioned in this specification are herein incorporated by reference to the same extent as if each individual publication, patent, or patent application was specifically and individu-ally indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed descrip-tion that sets forth illustrative embodiments, in which the principles of the invention are utilized, and the accompany-ing drawings of which:

FIGS. 3B through 3I illustrate discontinuities formed in an exterior layer of a layered orthodontic appliance, in accordance with many embodiments.

FIG. 5A illustrates a layered orthodontic appliance having a discontinuity, in accordance with many embodiments.

FIG. 5B illustrates the appliance of FIG. 5A when placed over a patient's teeth, in accordance with many embodi-ments.

FIG. 6 illustrates a method for fabricating an orthodontic appliance, in accordance with many embodiments.

DETAILED DESCRIPTION

Figure 1A:
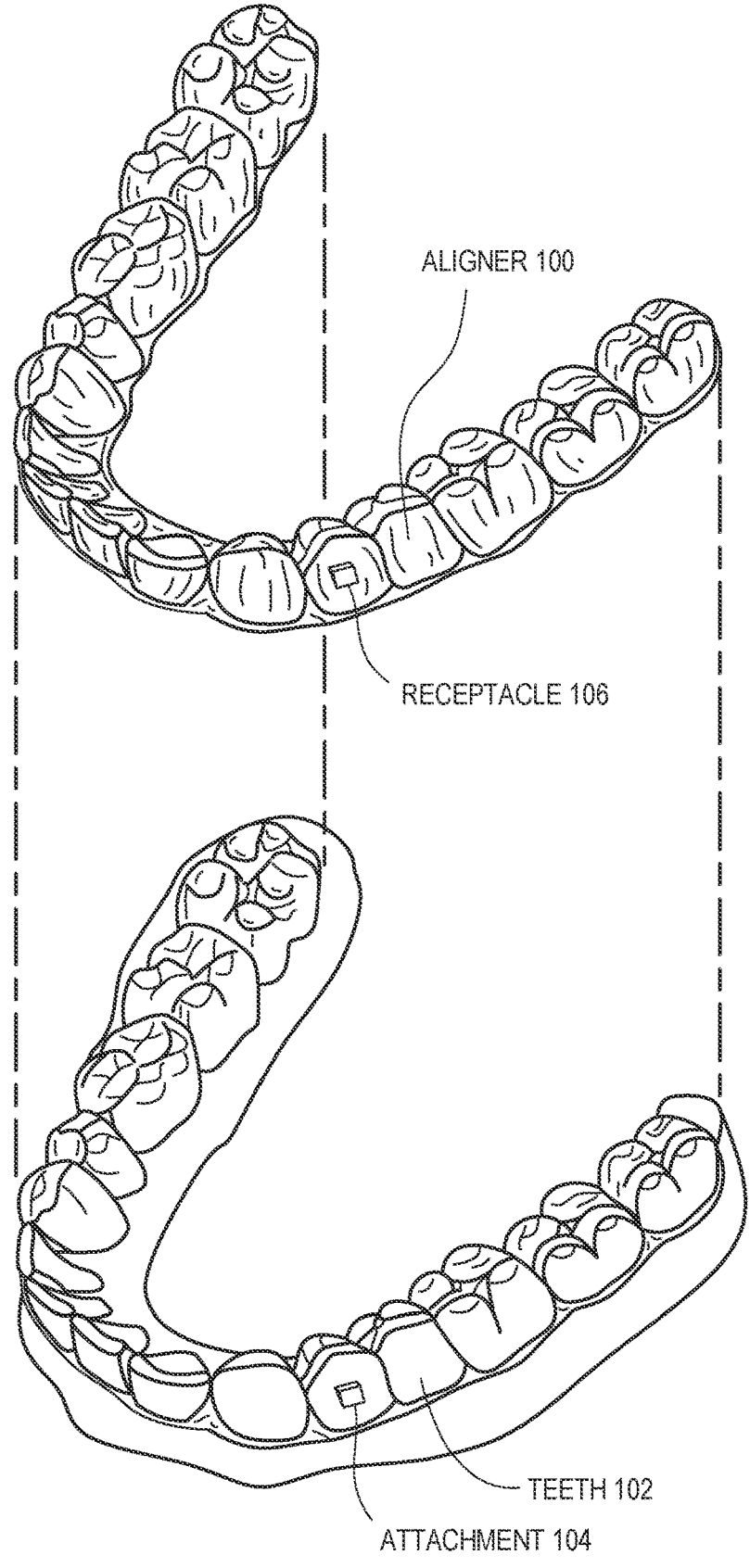
FIG. 1A illustrates a tooth repositioning appliance, in accordance with many embodiments.

A better understanding of the features and advantages of the present disclosure will be obtained by reference to the following detailed description that sets forth illustrative embodiments, in which the principles of embodiments of the present disclosure are utilized, and the accompanying draw-ings.

Although the detailed description contains many specif-ics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the methods, systems, and apparatus of the present disclosure provided herein without departing from the spirit and scope of the invention as described herein.

As used herein, A and/or B encompasses one or more of A or B, and combinations thereof such as A and B.

The orthodontic appliances described herein, along with related systems and methods, can be employed as part of an orthodontic treatment procedure in order to reposition one or more teeth, maintain a current position of one or more teeth, or suitable combinations thereof. An orthodontic appliance can include an exterior layer and an interior layer. The exterior layer can be formed from a relatively rigid material while the interior layer can be formed from a relatively elastic material, such that the exterior layer is stiffer than the interior layer. One or more discontinuities can be formed in the exterior layer while leaving the interior layer intact. The geometry and configuration of the discontinuity can be selected such that when the appliance is worn by a patient, the discontinuity interacts with the elastic interior layer so as to generate forces suitable for repositioning one or more of the patient's teeth. In many embodiments, the interior layer resists deformation, deflection, and/or displacement of the discontinuity, thereby causing forces to be applied to one or more teeth. The material properties (e.g., stiffness) of the appliances described herein can be varied via the discontinuities and/or elastic interior layer, thus affording different force application to different teeth of the patient's arch and, in some instances, more precise application or delivery of one or more forces to teeth with decreased patient discomfort. Vary (varied) may mean that the variations (e.g., differences in the values present in an appliance) in the corresponding material properties are more than 10%, more than 25%, or more than 50% of the highest value of the corresponding material property present in the appliance. Additionally, the techniques described herein can be used to adjust the local compliance of the appliance, therefore improving appliance fit and reducing patient discomfort.

Thus, in one aspect, an orthodontic appliance can include a shell having a plurality of cavities shaped to receive a patient's teeth. The shell can include an exterior layer and an interior layer having a stiffness less than a stiffness of the exterior layer. A discontinuity can be formed in the exterior layer. In many embodiments, the exterior layer has an elastic modulus within a range from about 10,000 psi to about 700,000 psi and the interior layer has an elastic modulus within a range from about 100 psi to about 8000 psi. In alternative embodiments, the interior layer has an elastic modulus within a range from about 100 psi to about 50,000 psi.

The design of the discontinuity can be varied as desired to elicit the appropriate tooth movements. For example, the discontinuity can include a cut formed in the exterior layer. The cut may extend at least partially around a protrusion formed in the exterior layer. In some instances, the cut may be a closed cut, such as a cut enclosing a region of the shell. The cut may extend from a buccal surface of the exterior layer to a lingual surface of the exterior layer. Alternatively or in addition, the discontinuity can include a plurality of cuts in the exterior layer, such as a plurality of cuts that are parallel to each other. The discontinuity can include a cut defining a flap in the exterior layer and a plurality of perforations near a joint portion of the flap.

The elements of the appliances described herein can be fabricated using any suitable method. The exterior and interior layers may have been thermoformed, for example. The discontinuity may have been etched or engraved in the exterior layer. In some instances, the discontinuity can include a shape etched in the exterior layer.

In another aspect, an orthodontic appliance can include a shell having a plurality of cavities shaped to receive a patient's teeth, the shell including a first layer and a second layer having a stiffness less than a stiffness of the first layer. A discontinuity can be formed in the first layer. In many embodiments, the first layer has an elastic modulus within a range from about 10,000 psi to about 700,000 psi and the second layer has an elastic modulus within a range from about 100 psi to about 8000 psi. In alternative embodiments, the second layer has an elastic modulus within a range from about 100 psi to about 50,000 psi. The first layer can comprise an exterior layer of the shell and the second layer can comprise an interior layer of the shell. Alternatively, the first layer can comprise an interior layer of the shell and the second layer can comprise an exterior layer of the shell.

The design of the discontinuity can be varied as desired. For example, the discontinuity can include a cut formed in the first layer. The cut may extend at least partially around a protrusion formed in the first layer. In some instances, the cut may be a closed cut, such as a cut enclosing a region of the shell. The cut may extend from a buccal surface of the first layer to a lingual surface of the first layer. Alternatively or in addition, the discontinuity can include a plurality of cuts in the first layer, such as a plurality of cuts that are parallel to each other. The discontinuity can include a cut defining a flap in the first layer and a plurality of perforations near a joint portion of the flap.

The components of the appliances described herein can be produced in a variety of ways. The first and second layers may have been thermoformed, for example. The discontinuity may have been etched or engraved in the first layer. In some instances, the discontinuity can include a shape etched in the first layer.

In another aspect, an appliance as described herein may be included in a series of appliances so as to provide an orthodontic system for positioning teeth. Such an orthodontic system can include a plurality of orthodontic appliances each comprising a shell including one or more cavities shaped to receive a patient's teeth. The appliances may be successively worn or wearable by the patient to move one or more teeth from a first arrangement to a second arrangement. One or more of the appliances can include layered appliance as described herein. For example, a layered appliance of the system can include an appliance shell having a plurality of cavities shaped to receive the patient's teeth. The shell can include an exterior layer and an interior layer having a stiffness less than a stiffness of the exterior layer. A discontinuity can be formed in the exterior layer. In many embodiments, the exterior layer has an elastic modulus within a range from about 10,000 psi to about 700,000 psi and the interior layer has an elastic modulus within a range from about 100 psi to about 8000 psi. In alternative embodiments, the interior layer has an elastic modulus within a range from about 100 psi to about 50,000 psi.

The geometry and configuration of the discontinuity can be selected so as to enable the application of one or more forces to a patient's teeth. The discontinuity can include a cut formed in the exterior layer. For instance, the cut may extend at least partially around a protrusion formed in the exterior layer. As another example, the cut may be a closed cut, such as a cut enclosing a region of the shell. The cut may extend from a buccal surface of the exterior layer to a lingual surface of the exterior layer. In some instances, the discontinuity can include a plurality of cuts in the exterior layer, such as a plurality of cuts that are parallel to each other. The discontinuity can include a cut defining a flap in the exterior layer and a plurality of perforations near a joint portion of the flap.

The exterior and interior layers of an appliance may have been thermoformed so as to form an appliance shell. The discontinuity may have been etched or engraved in the exterior layer. For example, the discontinuity can include a shape etched in the exterior layer.

In another aspect, an orthodontic system for repositioning a patient's teeth is provided. The orthodontic system can include a plurality of orthodontic appliances each comprising a shell including one or more cavities shaped to receive the patient's teeth. The appliances may be successively worn or wearable by the patient to move one or more teeth from a first arrangement to a second arrangement. One or more of the appliances can include a layered appliance as described herein. For example, a layered appliance can include an appliance shell having a plurality of cavities shaped to receive the patient's teeth. The appliance shell can include an first layer and an second layer having a stiffness less than a stiffness of the first layer. A discontinuity can be formed in the first layer. In many embodiments, the first layer has an elastic modulus within a range from about 10,000 psi to about 700,000 psi and the second layer has an elastic modulus within a range from about 100 psi to about 8000 psi. In alternative embodiments, the second layer has an elastic modulus within a range from about 100 psi to about 50,000 psi. The first layer can comprise an exterior layer of the appliance shell and the second layer can comprise an interior layer of the appliance shell. Alternatively, the first layer can comprise an interior layer of the appliance shell and the second layer can comprise an exterior layer of the appliance shell.

The geometry and configuration of the discontinuity can be selected based on forces desired to be applied to a patient's teeth. The discontinuity can include a cut formed in the first layer. For instance, the cut may extend at least partially around a protrusion formed in the first layer. As another example, the cut may be a closed cut, such as a cut enclosing a region of the shell. The cut may extend from a buccal surface of the first layer to a lingual surface of the first layer. In some instances, the discontinuity can include a plurality of cuts in the first layer, such as a plurality of cuts that are parallel to each other. The discontinuity can include a cut defining a flap in the first layer and a plurality of perforations near a joint portion of the flap.

The first and second layers of an appliance may have been thermoformed so as to form an appliance shell. The discontinuity may have been etched or engraved in the first layer. For example, the discontinuity can include a shape etched in the first layer.

In another aspect, a method for creating an orthodontic appliance as described herein can include providing a shell having a plurality of cavities shaped to receive a patient's teeth. The shell can include an exterior layer and an interior layer having a stiffness less than a stiffness of the exterior layer. In many embodiments, the exterior layer has an elastic modulus within a range from about 10,000 psi to about 700,000 psi and the interior layer has an elastic modulus within a range from about 100 psi to about 8000 psi. In alternative embodiments, the interior layer has an elastic modulus within a range from about 100 psi to about 50,000 psi. The exterior and interior layers of the shell may have been thermoformed. A discontinuity can be formed in the exterior layer. The process of forming the discontinuity may include creating a cut in the exterior layer, such as a cut extending at least partially around a protrusion formed in the exterior layer. The cut may be a closed cut. In some instances, the cut may extend from a buccal surface of the exterior layer to a lingual surface of the exterior layer. The discontinuity may also be formed by creating a plurality of cuts in the exterior layer, and the plurality of cuts may be parallel to each other. The discontinuity can include a cut defining a flap in the exterior layer and a plurality of perforations near a joint portion of the flap. As another example, forming the discontinuity may include etching or engraving the discontinuity in the exterior layer. The etching of the discontinuity in the exterior layer may include etching a shape in the exterior layer.

In another aspect, a method for creating an orthodontic appliance as described herein is provided. The method can include providing a shell having a plurality of cavities shaped to receive a patient's teeth. The shell can include a first layer and a second layer having a stiffness less than a stiffness of the first layer. In many embodiments, the first layer has an elastic modulus within a range from about 10,000 psi to about 700,000 psi and the second layer has an elastic modulus within a range from about 100 psi to about 8000 psi. In alternative embodiments, the second layer has an elastic modulus within a range from about 100 psi to about 50,000 psi. The first layer can comprise an exterior layer of the shell and the second layer can comprise an interior layer of the shell. Alternatively, the first layer can comprise an interior layer of the shell and the second layer can comprise an exterior layer of the shell.

The first and second layers of the shell may have been thermoformed. A discontinuity can be formed in the first layer. The process of forming the discontinuity may include creating a cut in the first layer, such as a cut extending at least partially around a protrusion formed in the first layer. The cut may be a closed cut. In some instances, the cut may extend from a buccal surface of the first layer to a lingual surface of the first layer. The discontinuity may also be formed by creating a plurality of cuts in the first layer, and the plurality of cuts may be parallel to each other. The discontinuity can include a cut defining a flap in the first layer and a plurality of perforations near a joint portion of the flap. As another example, forming the discontinuity may include etching or engraving the discontinuity in the first layer. The etching of the discontinuity in the first layer may include etching a shape in the first layer.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some instances, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807 and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
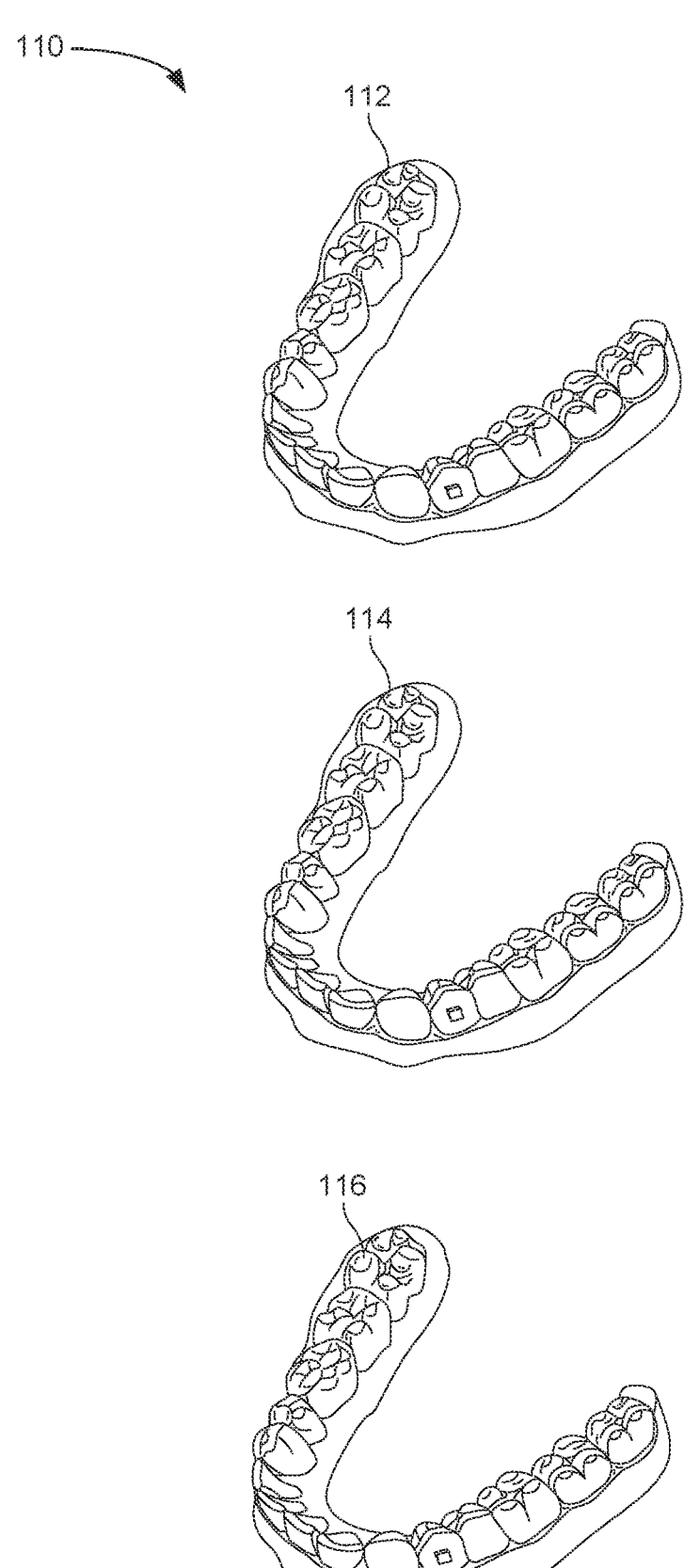
FIG. 1B illustrates a tooth repositioning system, in accor-dance with many embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 2:
FIG. 2 illustrates a method of orthodontic treatment using a plurality of appliances, in accordance with many embodi-ments.

FIG. 2 illustrates a method 200 of orthodontic treatment using a plurality of appliances, in accordance with many embodiments. The method 200 can be practiced using any of the appliances or appliance sets described herein. In step 210, a first orthodontic appliance is applied to a patient's teeth in order to reposition the teeth from a first tooth arrangement to a second tooth arrangement. In step 220, a second orthodontic appliance is applied to the patient's teeth in order to reposition the teeth from the second tooth arrangement to a third tooth arrangement. The method 200 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Although the above steps show a method 200 of orthodontic treatment using a plurality of appliances in accordance with embodiments, a person of ordinary skill in the art will recognize many variations based on the teaching described herein. Some of the steps may comprise sub-steps. Many of the steps may be repeated as often as beneficial to the treatment. One or more steps of the method 200 may be applied to any suitable orthodontic appliance, such as the embodiments described herein.

Various embodiments and configurations of appliances can be considered for the orthodontic systems and treatments described herein. For example, an appliance can include a plurality of layers, including at least one relatively elastic layer and at least one relatively rigid layer. Herein, "relatively elastic" and "relatively rigid" may indicate that the relatively rigid layer is more rigid (stiff) than the relatively elastic layer. For example, the (relatively) rigid layer may have an elastic modulus within a range from about 10,000 psi to about 700,000 psi, and the (relatively) elastic layer may have an elastic modulus within a range from about 100 psi to about 8000 psi, or from about 100 psi to about 50,000 psi. The elastic and rigid layers can be arranged in any suitable manner to form an appliance, such as with the elastic layer on the interior of the appliance and the rigid layer on the exterior of the appliance. "Interior" may be used herein to refer to portions of an appliance that are adjacent to or approximately adjacent to the received teeth when the appliance is worn, while "exterior" may be used to refer to portions of an appliance opposite from or approximately opposite from the received teeth when the appliance is worn. "Interior" and "exterior" may also be used herein to denote relative positioning rather than absolute positioning. In alternative embodiments, other configurations can be used, e.g., the appliance can be formed with the elastic layer on the exterior and the rigid layer on the interior.

The number of layers within a layered orthodontic appliance can be varied as desired. The appliance can include only a single elastic layer and only a single rigid layer. Alternatively, the appliance can include other layers in addition to the elastic layer and rigid layer, e.g., intermediate layers interspersed between the elastic and rigid layers. Optionally, the appliance can include a plurality of elastic layers and a plurality of rigid layers. As will be appreciated, the layered appliances described herein can impart forces on one or more of the patient's teeth so as to elicit various tooth movements in accordance with a desired treatment procedure.

Figure 3A:
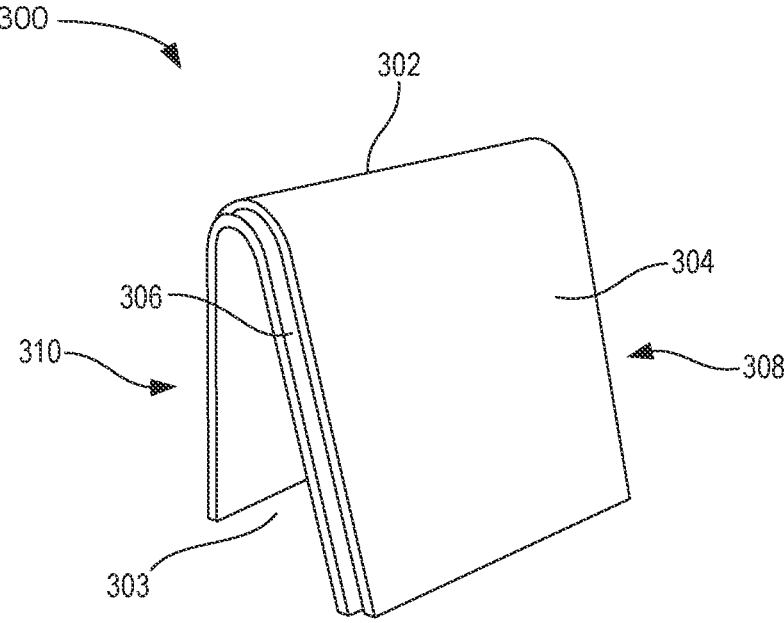
FIG. 3A illustrates a portion of a layered orthodontic appliance, in accordance with many embodiments.

FIG. 3A illustrates a portion of a layered orthodontic appliance 300, in accordance with many embodiments. The appliance 300 can include a shell 302 having one or more teeth-receiving cavities 303 shaped to accommodate a patient's teeth. The shell 302 can include an exterior layer 304 and interior layer 306. Accordingly, when the appliance 300 is worn over a patient's teeth, the interior layer 306 may contact the teeth, while the exterior layer 304 may not be in contact with the teeth. In some instances, the inner surface of the interior layer 306 may be covered by one or more additional layers of material (not shown), such that the interior layer 306 does not directly contact the teeth. These additional layers may be provided primarily as an interface for improving the contact between the shell 302 and the teeth and/or gingiva, and thus may be relatively thin compared to the exterior and interior layers 304, 306. Optionally, one or more additional layers can also be situated at other locations of the shell 302, e.g., between the exterior layer 304 and interior layer 306, over the outer surface of the exterior layer 304, etc.

The exterior and interior layers 304, 306 may each span the entirety of the appliance 300, or only certain portions of the appliance 300. In many embodiments, the exterior and interior layers 304, 306 extend from the lingual surface 308 to the buccal surface 310 of the appliance 300, thereby covering the lingual, occlusal, and buccal surfaces of the teeth received within the appliance 300. Optionally, one or more portions of the exterior layer 304 and/or interior layer 306 may also extend over the gingiva. The exterior and interior layers 304, 306 may overlap each other such that they cover the same or similar portions of the patient's teeth when the appliance 300 is worn. The exterior layer 304 and interior layer 306 can be coupled to each other (e.g., by one or more discrete attachment points and/or over one or more continuous attachment areas) at the overlapping portions, thereby forming a bilayered shell structure. In many embodiments, the exterior and interior layers 304, 306 overlap over the entirety of the appliance 300 so that the whole appliance 300 is at least bilayered. Alternatively, the exterior and interior layers 304, 306 may not overlap over some portions of the appliance 300, such that the teeth received within these portions are covered by the exterior layer 304 without the interior layer 306, or vice-versa. Some portions of the appliance 300 may be formed from other materials or components, and thus may not include either of the exterior or interior layers 304, 306.

The exterior layer 304 may be relatively rigid and the interior layer 306 may be relatively elastic. Consequently, the stiffness of the interior layer 306 may be less than the stiffness of the exterior layer 304. The properties (e.g., stiffness) of the appliance 300 at the bilayered portions may be determined primarily by the properties of the exterior layer 304, with relatively little contribution from the elastic interior layer 306. Accordingly, these portions of the appliance 300 may be relatively rigid and may experience little or no deformation when placed on the patient's teeth. Conversely, portions of the appliance 300 where there are discontinuities in the exterior layer 304 may permit greater contributions from the interior layer 306 and therefore may be relatively flexible and/or deformable, as discussed in further detail below.

The properties of the exterior and interior layer 304, 306 can be varied as desired. For example, the interior layer 306 may have an elastic modulus of about 600 psi, or within a range from about 100 psi to about 8000 psi, or from about 100 psi to about 50,000 psi. The exterior layer 304 may have an elastic modulus of approximately 100,000 psi, or within a range from approximately 10,000 psi to approximately 700,000 psi. The elastic modulus of the interior layer 306 may be approximately 100%, 90%, 80%, 70%, 60%, 50%, 40%, 30%, 30%, or 10% of the elastic modulus of the exterior layer 304. In many embodiments, the stiffness of each layer is related to the thickness of the layer. The exterior and interior layers 304, 306 may have the same thickness or different thicknesses. For instance, the thickness of the interior layer 304 may be approximately 0.02 mm, or within a range from approximately 0.01 mm to approximately 1.0 mm. The thickness of the exterior layer 306 may be approximately 0.05 mm, or within a range from approximately 0.02 mm to approximately 1.0 mm. The thickness of the interior layer 304 may be approximately 100%, 90%, 80%, 70%, 60%, 50%, 40%, 30%, 30%, or 10% of the thickness of the exterior layer 306.

In alternative embodiments, the exterior layer 304 may be relatively elastic and the interior layer 306 may be relatively rigid, such that the stiffness of the exterior layer 304 is less than the stiffness of the interior layer 306. It shall be understood that although various embodiments presented herein illustrate a shell with a rigid exterior layer and elastic interior layer, the concepts of the present disclosure are also applicable to alternative configurations of layered appliances, e.g., appliances including a shell with an elastic exterior layer and rigid interior layer.

A layered appliance as described herein can include one or more discontinuities formed in one or more of the layers, e.g., the exterior layer, the interior layer, the elastic layer, the rigid layer, or combinations thereof. In many embodiments, the one or more discontinuities are formed in only a single layer, e.g., the exterior layer only, the interior layer only, the elastic layer only, or the rigid layer only, such that the other layer(s) do not include any discontinuities. Although various embodiments herein describe discontinuities formed in only a rigid exterior layer of a layered orthodontic appliance, it shall be understood that alternative embodiments can include discontinuities formed in other layers, e.g., an elastic interior layer, a rigid interior layer, etc.

A discontinuity can include any suitable number and combination of cuts, flaps, apertures (e.g., openings, windows, gaps, notches), or deformations (e.g., protrusions, indentations, reliefs) formed in any suitable portion of the layer, such as an exterior layer, (e.g., in a buccal, lingual, occlusal, and/or gingival surface). The dimensions (e.g., length, width, depth, surface area, etc.) and/or the shape of the discontinuity can be calculated, for instance, to achieve a specified degree of appliance compliance. A discontinuity may be linear, curved, curvilinear, circular, elliptical, triangular, square, rectangular, polygonal, or any other regular or irregular shape, or suitable portions or combinations thereof. A discontinuity can be oriented along any direction, such as along an occlusal-gingival direction, a mesial-distal direction, or a buccal-lingual direction.

The number, geometry, and configuration of the discontinuities can be selected so as to modulate the local properties (e.g., compliance or stiffness) of the appliance and/or influence the forces imparted onto the patient's teeth via the appliance. The forces may be provided wholly or in part by the interaction of the layer (e.g., an elastic interior layer) with the discontinuity, and may result from deformations, deflections, and/or displacements of the discontinuity and/or interior layer when the appliance is worn on a patient's teeth. The geometry and configuration of the discontinuities described herein can be selected to control the magnitude and/or direction of the forces applied to the teeth.

Figure 3B:
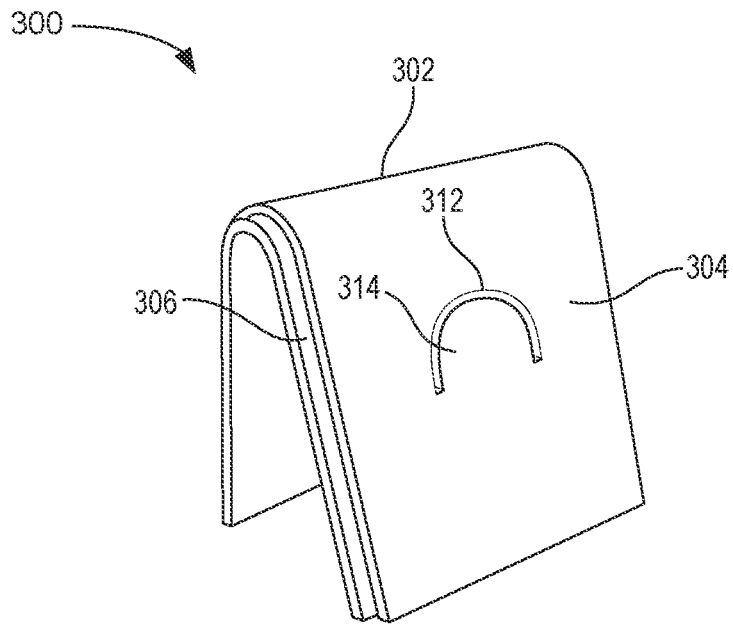

FIG. 3B illustrates a discontinuity 312 formed in the exterior layer 304 of the appliance 300, in accordance with many embodiments. The discontinuity 312 can be formed solely in the exterior layer 304 such that the interior layer 306 is left intact. The interior layer 306 may be exposed through the discontinuity 312. The presence of the discontinuity 312 may alter the properties of the appliance 300 at or near the discontinuity 312. For example, in many embodiments, the exposed interior layer 306 is less rigid than the exterior layer 304, such that the local compliance of the appliance 300 at or near the discontinuity 312 may be increased compared to other portions of the appliance 300. In some instances, the discontinuity 312 may be deformable (e.g., changeable with respect to shape, size) and/or displaceable, e.g., when the appliance is worn, which may also produce an increase in the local compliance of the appliance. The amount of local compliance can be used to control the resulting forces (e.g., magnitude, direction) exerted on the underlying teeth. Furthermore, the interior layer 306 may interact with the discontinuity 312, such as by exerting forces on the discontinuity 312 or on portions of the exterior layer 304 near the discontinuity 312. These forces may result wholly or in part from deformation or displacement of the discontinuity 312 and/or interior layer 306 when the appliance 300 is worn, as described in greater detail below. The forces generated by the interaction of the interior layer 306 and the discontinuity 312 may be transmitted to the underlying teeth via the shell 302, thereby causing the repositioning of one or more teeth. The forces can be applied directly to the teeth by the shell 302. Alternatively, the shell 302 can apply force indirectly, e.g., via one or more attachments mounted on one or more teeth (not shown). In such instances, the discontinuity 312 can be shaped to accommodate the attachment.

In FIG. 3B, the discontinuity 312 is depicted as an arcuate cut forming a semicircular flap 314 in the exterior layer 304. Alternatively, other geometries for the cut and flap 314 can be used (e.g., elliptical, square, rectangular, triangular, polygonal, etc.). The edges of the flap 314 may be joined to the edges of adjacent portions of the exterior layer 304 by the underlying interior layer 306. The flap 314 may be outwardly and/or inwardly deflectable relative to the surrounding portions of the exterior layer 304. In some instances, the arcuate cut can extend around a feature formed in the shell 302, such as a protrusion, indentation, or relief. Optionally, the arcuate cut can be situated adjacent to or near a tooth-mounted attachment when the appliance 300 is worn by a patient.

Figure 3C:
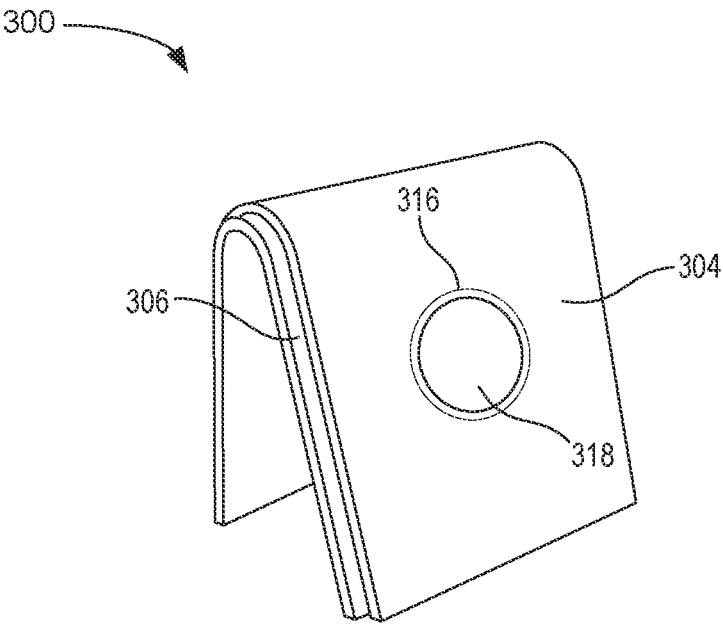

FIGS. 3C through 3F illustrate other exemplary discontinuities that may be provided as part of the appliance 300, in accordance with many embodiments. FIG. 3C illustrates a discontinuity formed as a closed cut 316. The closed cut 316 encloses a region 318 of the exterior layer 304, thus separating it from the rest of the exterior layer 304. The interior layer 306 may span the closed cut 316 so as to join the edges of the enclosed region 318 to the edges of the adjacent portions of the exterior layer 304. The closed cut 316 may be a circular cut, as depicted herein, or any other suitable shape. The separated region 318 defined by the closed cut 316 may include a feature such as a protrusion, indentation, or relief. The separated region 318 may be displaceable relative to the surrounding portions of the exterior layer 304.

FIG. 3D illustrates a discontinuity formed as an elongate linear cut 320. The linear cut 320 may extend from the buccal surface to the lingual surface of the exterior layer 304. The dimensions of the linear cut 320 can be varied as desired. For example, the linear cut 320 may extend from the buccal edge to the lingual edge of the appliance 300, thus separating the exterior layer 304 into discrete segments 322, 324. The segments 322, 324 may be joined to each other by the portions of the interior layer 306 spanning the linear cut 320. The segments 322, 324 may be displaced relative to each other when the appliance 300 is placed on the patient's teeth. In many embodiments, the linear cut 320 is positioned adjacent to or near an interproximal region between teeth, with the segments 322, 324 at least partially covering the teeth adjacent to the interproximal region. Accordingly, the segments 322, 324 can be shaped to receive teeth or portions thereof.

FIG. 3E illustrates a discontinuity formed as a plurality of elongate linear cuts 326. Any suitable number of linear cuts 326 can be used. The linear cuts 326 may have the same or similar dimensions (e.g., length, width). Similar may mean that the variation of the dimension may be no more than 50%, no more than 25%, or no more than 10% of the maximum value of a corresponding dimension in the appliance. Alternatively, some of the cuts 326 may have different dimensions than other cuts 326, for example, variations of more than 10%, more than 25%, or more than 50% of the maximum value of a corresponding dimension in the appliance. Some or all of the linear cuts 326 may be parallel cuts. Conversely, some or all of the linear cuts 326 may not be parallel to each other. The linear cuts 326 can be spaced apart from each other by a specified distance. The spacing between the linear cuts 326 may be uniform or may vary. The portions of the exterior layer 304 adjacent the linear cuts 326 may be joined by the interior layer 306 underlying the cuts 326. The cuts 326 may deform (e.g., stretch, widen) when the appliance 300 is worn by the patient.

FIG. 3F illustrates a discontinuity formed as an etched shape 328 in the exterior layer 304. The shape 328 can be etched only partially into the exterior surface of the exterior layer 304, such that the interior layer 306 is not exposed. Alternatively, the etching may penetrate through the entire depth of the exterior layer 304 so as to expose the interior layer 306. The etching of the exterior layer 304 may reduce the thickness of the exterior layer 304 at the discontinuity, which may alter the properties (e.g., stiffness) of the appliance 300 at or near the discontinuity. For instance, the presence of the etched shape 328 may increase the influence of the interior layer 306 on the local compliance of the appliance 300 (e.g., reduce the local compliance).

The etched shape 328 is depicted herein as a collapsible structure including a ring 330 and a disk 332, although other geometries can also be used. The interior layer 306 may join the ring 330 and disk 332. In the collapsed configuration of the etched shape 328 (e.g., when the appliance 300 is not being worn by a patient), the ring 330 and disk 332 may lie in approximately the same plane as the surrounding portions of the exterior layer 304. In the expanded configuration of the etched shape 328 (e.g., when the appliance 300 is worn by the patient), the ring 330, disk 332, and intervening portions of the interior layer 306 can protrude outwards from the surrounding exterior layer 304 so as to form a receptacle. The receptacle can be shaped, for instance, to receive an attachment mounted on the underlying tooth, and to exert force onto the tooth via the attachment.

FIGS. 3G through 3I each illustrate a discontinuity formed as a cut 334 defining a flap 336 in the exterior layer 304, similar to the embodiment depicted in FIG. 3B. The flap 336 can be deflected relative to the surrounding portions of the exterior layer 304, e.g., to accommodate an underlying tooth surface, shell feature, and/or tooth attachment. In order to increase the movement range of the flap 336 and/or reduce the magnitude of the forces needed to deflect the flap 336, it may be beneficial to modify the exterior layer 304 to reduce the flexing resistance of the material at or near the joint portion of the flap 336. This may be accomplished by forming one or more discontinuities in the exterior layer 304 at or near the joint portion. In many embodiments, the discontinuities can be positioned so as to define the joint portion that flexes during deflection of the flap 336. Any suitable number and combination of discontinuities can be used, and the geometry (e.g., size, shape) and configuration of the discontinuities can be varied as desired in order to provide the appropriate amount of flexing resistance at or near the joint portion. For instance, FIG. 3G illustrates a plurality of perforations 338 formed in the exterior layer 304 at the joint portion of the flap 336. The perforations 338 may be oval-shaped, as depicted in FIG. 3G, or any other suitable geometry (e.g., circular, square, triangular, polygonal, etc.). As another example, FIG. 3H illustrates a plurality of small circular perforations 340 formed in the exterior layer 304 at the joint portion. At least some of the discontinuities presented herein may extend through the entire thickness of the exterior layer 304, thereby exposing the underlying interior layer 306. In alternative embodiments, the discontinuities may only extend partially through the exterior layer 304, thereby reducing the thickness of the material at or near the joint portion. For example, FIG. 3I illustrates a groove 342 formed in the exterior layer 304 near the joint portion of the flap 336. The ends of the groove 342 may contact the cut 334. In alternative embodiments, the ends of the groove 342 may not be in contact with the cut 334. The groove 342 can be etched or engraved into the exterior layer 304 to a depth that is less than the thickness of the exterior layer 304. The dimensions (e.g., length, width, depth) and shape (e.g., linear, curved, curvilinear) of the groove 342 can be configured to optimize the flexibility of the flap 336.

The layered appliances described herein can be worn by a patient so as to apply force onto one or more underlying teeth, and thereby effect various movements of the teeth. The direction and extent of the resultant tooth movements can be determined based on the geometry, configuration, and properties of the discontinuity, interior layer, and/or exterior layer. Furthermore, the appliances described herein may incorporate various features (e.g., protrusions, indentations, grooves, notches, buttons, reliefs) formed in the appliance shell (e.g., in the interior and/or exterior layer) that can engage the teeth at discrete points and/or over continuous regions so as to further influence the magnitude and/or direction of the forces imparted on the teeth. The number, geometry, and configuration of such features can be selected based on the desired movements for the targeted teeth.

Figure 4A:
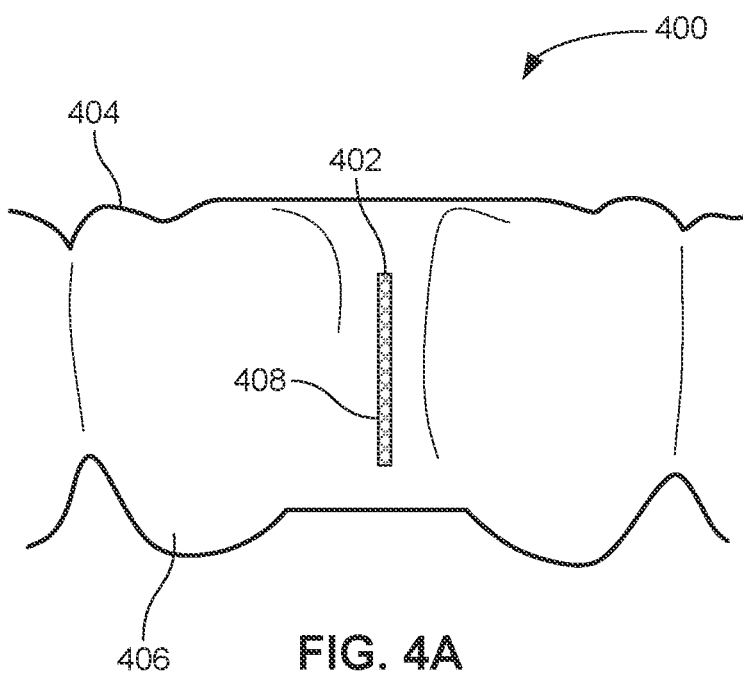
FIG. 4A illustrates a layered orthodontic appliance having a discontinuity, in accordance with many embodiments.
Figure 4B:
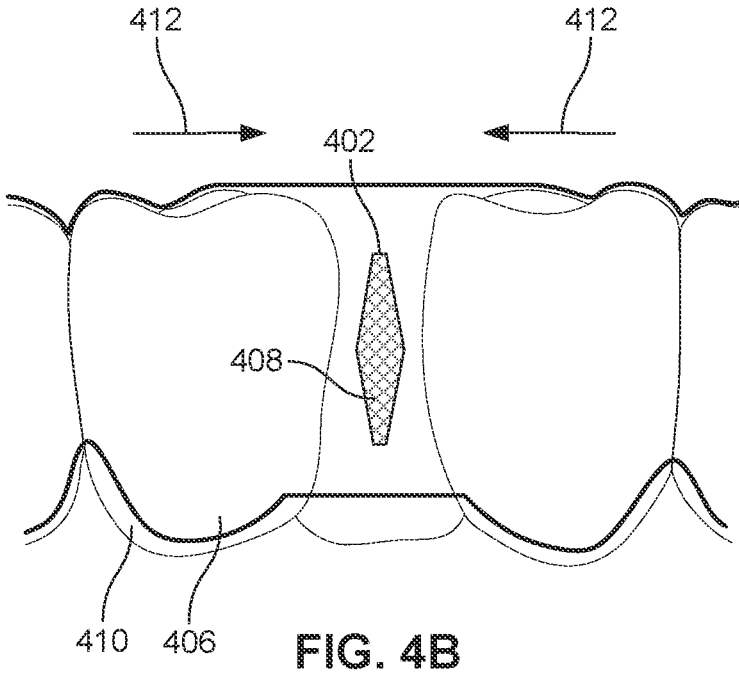
FIG. 4B illustrates the appliance of FIG. 4A when placed over a patient's teeth, in accordance with many embodi-ments.

FIGS. 4A and 4B illustrate a layered orthodontic appliance 400 having a discontinuity 402, in accordance with many embodiments. The appliance 400 can include a shell 404 formed from an exterior layer 406 and elastic interior layer 408, with a portion of the interior layer 408 exposed through the discontinuity 402 (depicted herein as an elongate linear cut). In other embodiments, no portion of the interior layer may be exposed through the discontinuity, e.g., in embodiments where the discontinuity does not penetrate through the entire exterior layer. When the appliance 400 is placed on a patient's teeth 410 (depicted in FIG. 4B), the discontinuity 402 may be deformed by the intentional mismatch between the patient's current tooth arrangement and the tooth arrangement specified by the geometry of the appliance 400. For instance, the elongate linear cut of the discontinuity 402 may be widened into an elongate aperture. Additionally, one or more portions of the interior layer 408 spanning the discontinuity 402 may also be deformed (e.g., stretched) according to the deformation of the discontinuity 402. The resistance of the interior layer 408 to deformation may cause forces to be exerted on the discontinuity 402 and/or the surrounding portions of the exterior layer 406. Some or all of these forces may be transmitted to the underlying teeth, thereby eliciting movements of one or more teeth with respect to up to six degrees of freedom of motion (e.g., translation, rotation, intrusion, extrusion, tipping, torqueing, etc.). For example, the interaction of the discontinuity 402 and interior layer 408 may produce tooth movements that reduce an interproximal space between teeth (e.g., arrows 412). Alternatively or additionally, the appliance 400 may be used to produce other types of tooth movements, such as tooth movements increasing an interproximal space between teeth (e.g., to correct malocclusions, to accommodate an implant or other dental prosthesis, etc.). As the teeth are repositioned, the deformation of the discontinuity 402 and/or the interior layer 408 may decrease, thus diminishing the amount of force expressed on the teeth by the appliance 400.

FIGS. 5A and 5B illustrate cross-sectional views of a layered orthodontic appliance 500 having a discontinuity 502, in accordance with many embodiments. The appliance 500 can include a shell 504 having an exterior layer 506 and elastic interior layer 508. The discontinuity 502 can be a cut forming a flap in the exterior layer 506, similar to the embodiments depicted in FIGS. 3B and 3G through 3I. The edges of the cut may be joined by the interior layer 508. The shell 504 can include a feature such as a protrusion 510 (e.g., a button, knob, etc.) situated on the flap and extending into the interior cavity of the appliance 500. When a tooth 512 is received within the appliance 500, the protrusion 510 and flap may be displaced outwards by the surface topography of the tooth 512. The elastic interior layer 508 may resist the displacement by exerting force on the exterior layer 506 at or near the discontinuity 502, thereby pulling the protrusion 510 and flap inwards against the tooth surface (e.g., arrow 514). The exerted force may be transmitted to the tooth 512 primarily at the point of contact between the surface of the tooth 512 and the protrusion 510. The application of force to the contact point can elicit various movements of the tooth 512, such as a tipping movement. In some instances, a plurality of protrusions can be used in combination with a plurality of discontinuities so as to provide a plurality of contact points for more precise application of forces to the tooth.

Various different embodiments or configurations may be considered for the layered appliances described herein. For example, an appliance may accommodate various different configurations for elastic and/or rigid layers, including different compositions and/or structures of elastic and/or rigid materials. Material forming a layer may include a single continuous layer of material or multiple layers of the same material, different materials, or a combination of some layers of the same material and one or more layers of different material(s). Properties of the material layer such as resiliency, elasticity, hardness/softness, color, and the like can be determined, at least partially, based on the selected material, layers of material, and/or layer thickness. In some instances, the layer can be configured such that one or more properties are uniform along a length or portion of the layer (or entire layer). Additionally, one or more properties of the layer may vary along a length or portion of the layer (or entire layer). Vary (or variable) may for example mean that the variations of the one or more properties is higher than 10%, higher than 25%, or higher than 50% of the highest value of the corresponding property/properties of the elastic material. For example, a layer may have substantially uniform thickness along a length or portion, or may vary along a length/portion. Substantially uniform may mean that the variations (e.g., the absolute value of the difference between any two values of one property with regard to the appliance) of the one or more properties is no higher than 50%, no higher than 25%, or no higher than 10% of the highest value of the corresponding property/properties of the elastic material. As will be appreciated, characteristics of the layer or layer may be selected so as to affect the force application to the patient's teeth or tooth movement aspects of a particular treatment desired.

FIG. 6 illustrates a method 600 for fabricating an orthodontic appliance, in accordance with many embodiments. The method 600 can be applied to any embodiment of the orthodontic appliances described herein.

In step 610, a shell having a plurality of cavities shaped to receive teeth is provided. The shell can include a first layer and a second layer having a stiffness less than a stiffness of the first layer, such that the first layer is relatively rigid and the second layer is relatively elastic. For example, the first layer can be an exterior layer of the shell and the second layer can be an interior layer of the shell. Alternatively, the first layer can be an interior layer of the shell and the second layer can be an exterior layer of the shell. The second and first layers can be formed from any suitable material or combination of materials. For example, the first layer and/or second layer can be formed from biocompatible materials suitable for orthodontic use, such as latex. In some instances, the first and second layers are transparent, translucent, or colored, so as to improve the aesthetics of the appliance when worn by a patient. The first layer (e.g., the relatively rigid layer) can be fabricated from materials similar or corresponding to those used for conventional single layered appliance shells, such as polymeric sheets. The materials for the first layer may be more rigid than those typically used for single layered shells. The second layer (e.g., the relatively elastic layer) can be fabricated from any suitable elastic material, and such materials may be provided as strips, bands, sheets, meshes, coatings, layers, or suitable combinations thereof. The characteristics of the elastic material (e.g., length, width, thickness, area, shape, cross-section, stiffness, etc.) may be homogeneous throughout the bulk of the elastic material, or may be variable. For example, different portions of the second layer may have different thicknesses, thereby altering the local compliance of the appliance shell. Furthermore, in some instances, the second layer may have anisotropic characteristics. As an example, the second layer may be relatively compliant along a first direction, and less compliant (or noncompliant) along a second direction. The directionality of the second layer can be used to control the direction of the resultant forces applied to the teeth. Optionally, the second layer can be formed with topological features (e.g., embossing, brushing, texturing, roughening, etc.) to enhance surface friction between the shell and the enamel of the received teeth. Such features can be used, for instance, to improve the ability of the shell to grip onto teeth when worn by the patient.

The shell can be fabricated using any suitable method, such as thermoforming, rapid prototyping, stereolithography, or computer numerical control (CNC) milling. For example, the first and second layers may be thermoformed to form the shell. The layers may be thermoformed simultaneously or sequentially. An interior layer may be thermoformed first and an exterior layer subsequently thermoformed on top of the interior layer. The thermoforming process may directly bond the first and second layers together (e.g., via thermal bonding) without the use of adhesives or other indirect bonding methods. Alternatively or in addition, adhesive agents can be used to couple the first and second layers to each other. In some instances, an exterior layer may be formed first, with an interior layer being subsequently coupled to the exterior layer (e.g., by dipping, spraying, extruding, coating, etc.), or vice-versa. The bilayered shells described herein can be fabricated based on a physical or digital model of the patient's teeth. The model can be generated from dental impressions or scanning (e.g., of the patient's intraoral cavity, of a positive or negative model of the patient's intraoral cavity, or of a dental impression formed from the patient's intraoral cavity).

In step 620, a discontinuity is formed in the first layer. Any method suitable for creating cuts in the first layer or removing material from the first layer can be used to create one or more discontinuities. For example, the discontinuity can be engraved or etched in the first layer (e.g., using CNC-based or laser-based methods). The discontinuity may be formed without disturbing the second layer. The discontinuity may penetrate through the entire thickness of the first layer so as to expose the underlying second layer, or may penetrate only partially through the first layer so that the second layer is not exposed. In many embodiments, the discontinuity is located only in the first layer, such that the second layer is left intact.

Although the above steps show a method 600 for fabricating an orthodontic appliance in accordance with embodiments, a person of ordinary skill in the art will recognize many variations based on the teaching described herein. Some of the steps may comprise sub-steps. Many of the steps may be repeated as often as beneficial to the treatment. One or more steps of the method 600 may be applied to any suitable orthodontic appliance, such as the embodiments described herein. The order of the steps can be varied. For example, in alternative embodiments, a layered orthodontic appliance can be fabricated by first providing a first (e.g., exterior) layer, and forming a discontinuity in the first layer as described above. The first layer can subsequently be coupled to an elastic second (e.g., interior) layer to form a bilayered shell, using any of the techniques discussed herein.

Appliance fabrication or design can make use of one or more physical or digital representations of the patient's teeth. Representations of the patient's teeth can include representations of the patient's teeth in a current arrangement, and may further include representations of the patient's teeth repositioned in one or more treatment stages. Treatment stages can include a desired or target arrangement of the patient's teeth, such as a desired final arrangement of teeth. Treatment stages can also include one or more intermediate arrangements of teeth (e.g., planned intermediate arrangements) representing arrangements of the patient's teeth as the teeth progress from a first arrangement (e.g., initial arrangement) toward a second or desired arrangement (e.g., desired final arrangement).

Figure 7:
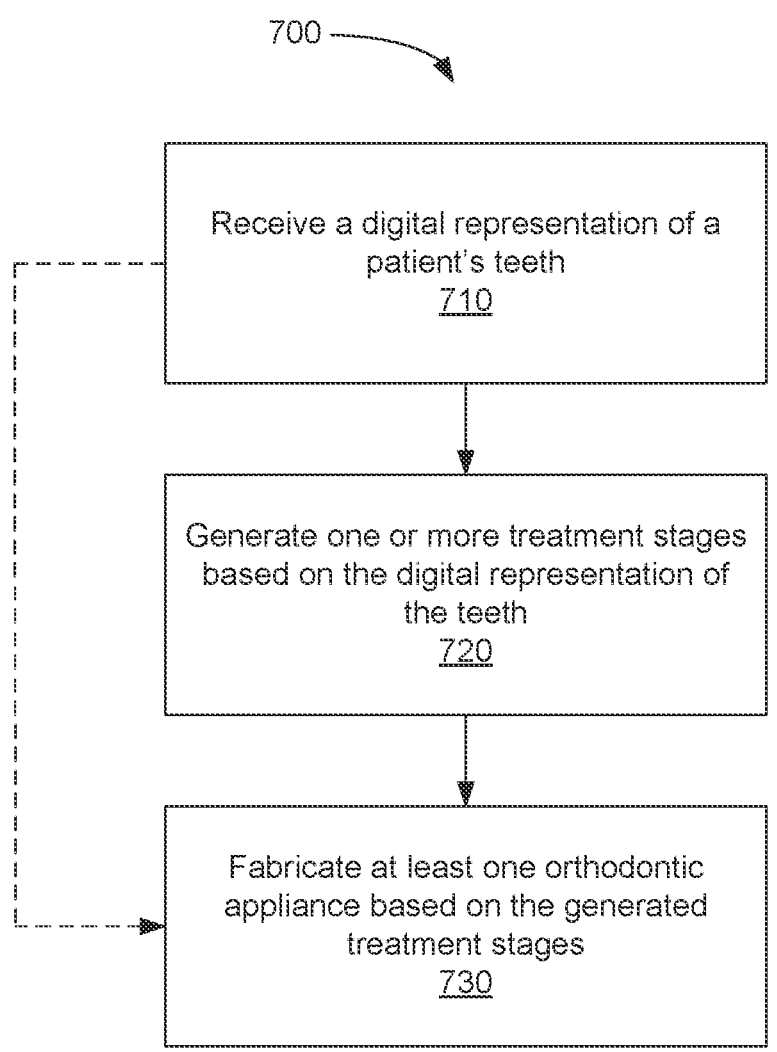
FIG. 7 illustrates a method for digitally planning an orthodontic treatment, in accordance with many embodi-ments.

FIG. 7 illustrates a method 700 for digitally planning an orthodontic treatment and/or design or fabrication of an appliance, in accordance with many embodiments. The method 700 can be applied to any of the treatment procedures described herein and can be performed by any suitable data processing system.

In step 710, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 720, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 730, at least one orthodontic appliance is fabricated based on the generated treatment stages. For example, a set of appliances can be fabricated to be sequentially worn by the patient to incrementally reposition the teeth from the initial arrangement to the target arrangement. Some of the appliances can be shaped to accommodate a tooth arrangement specified by one of the treatment stages. Alternatively or in combination, some of the appliances can be shaped to accommodate a tooth arrangement that is different from the target arrangement for the corresponding treatment stage. For example, as previously described herein, an appliance may have a geometry corresponding to an overcorrected tooth arrangement. Such an appliance may be used to ensure that a suitable amount of force is expressed on the teeth as they approach or attain their desired target positions for the treatment stage. As another example, an appliance can be designed in order to apply a specified force system on the teeth and may not have a geometry corresponding to any current or planned arrangement of the patient's teeth.

The appliance set may include one or more of the layered appliances described herein. The properties of the interior and exterior layers of these appliances (e.g., geometry, configuration, material characteristics) and the configuration of one or more discontinuities in the exterior layer can be selected to elicit the tooth movements specified by the corresponding treatment stage. In many embodiments, a layered appliance associated with a treatment stage may omit one or more portions of the interior layer or exterior layer. The determination of which portions to omit may be based on the particular tooth movements to be achieved during the treatment stage. For example, when contacting a tooth, the relatively elastic interior layer may produce increased frictional forces compared to the exterior layer. Accordingly, the removal of portions of the interior layer may in some instances facilitate the movement of the tooth relative to the appliance. Conversely, the presence of the interior layer at certain locations may be beneficial in embodiments where increased friction between the tooth surface and the appliance enhances force application onto the tooth.

The design of the layered appliances provided herein can be determined via suitable computer software or other digital-based approaches. For example, computer modeling strategies can be used to determine suitable force systems including one or more forces and/or torques to be applied to the teeth to elicit the desired tooth movements. The arrangement and properties of the interior and exterior layers and the configuration of one or more discontinuities in the exterior layer can be designed to provide the specified forces and/or torques when the appliance is worn by the patient during an appropriate stage of treatment. Additional examples of digital modeling and force analysis techniques suitable for use with the embodiments provided herein are described in application Ser. Nos. 12/623,340, 12/324,714, and 13/365,167, and in U.S. Pat. No. 8,439,672, the disclosures of which are herein incorporated by reference in their entirety. The digital models created using such methods may be used as input to a computer-controlled fabrication system for fabricating appliances.

Although the above steps show method 700 of digitally planning an orthodontic treatment and/or design or fabrication of an appliance in accordance with embodiments, a person of ordinary skill in the art will recognize many variations based on the teaching described herein. Some of the steps may comprise sub-steps. Many of the steps may be repeated as often as beneficial to the treatment. One or more steps of the method 700 may be applied to the fabrication of any orthodontic appliance, such as the embodiments described herein. Some of the steps may be optional, and the order of the steps can be varied. In some instances, staging of various arrangements or treatment stages may not be necessary for design and/or fabrication of an appliance. As illustrated by the dashed line in FIG. 7, design and/or fabrication of an orthodontic appliance, and perhaps a particular orthodontic treatment, may include use of a representation of the patient's teeth (e.g., receive a digital representation of the patient's teeth 710), followed by design and/or fabrication of an orthodontic appliance based on a representation of the patient's teeth in the arrangement represented by the received representation. For example, a positive or negative model may be generated based on the representation of the patient's teeth (e.g., as in step 710), followed by thermoforming of the interior and exterior layers onto the positive or negative model to form an appliance shell as described in various embodiments herein.

Figure 8:
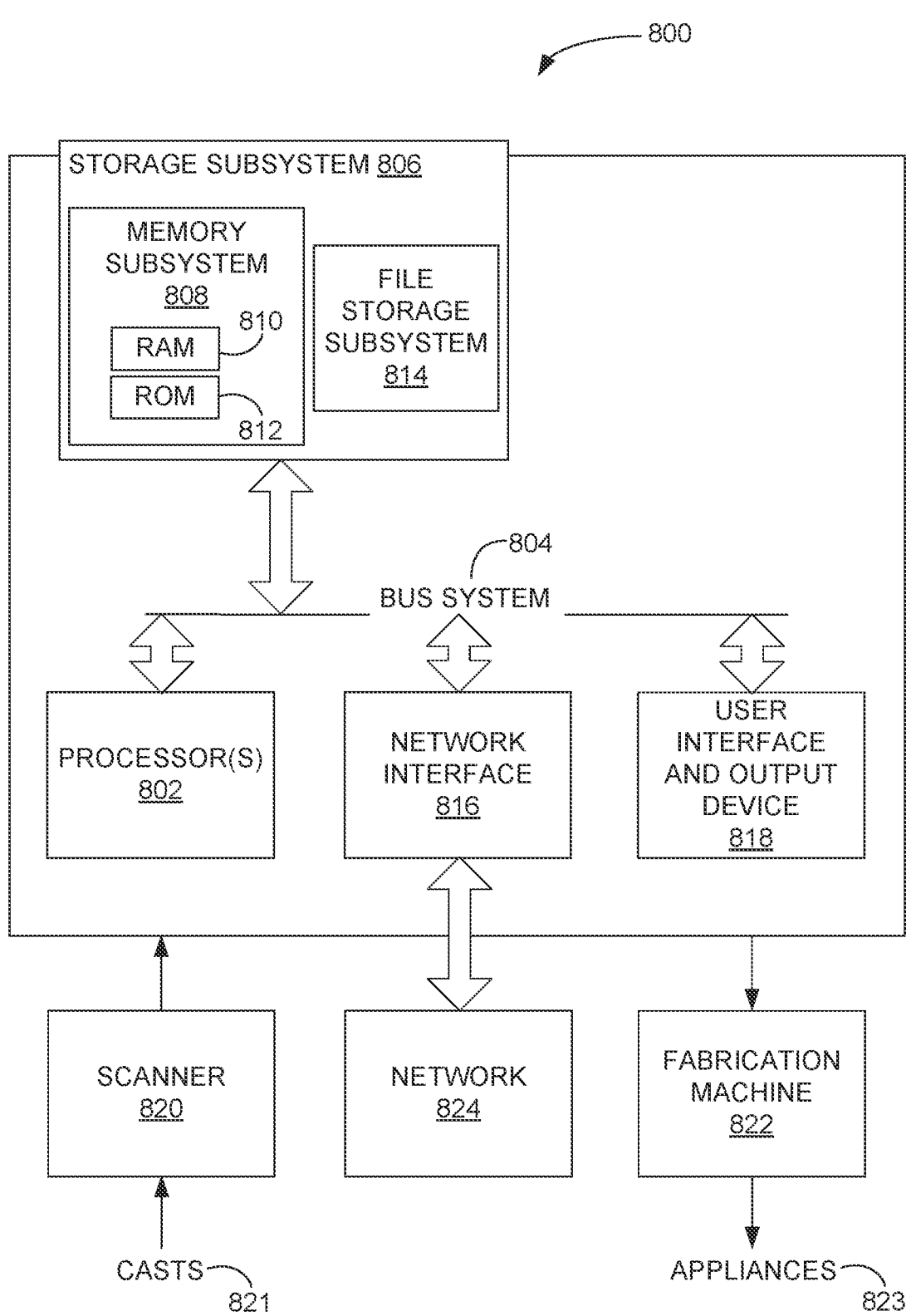
FIG. 8 is a simplified block diagram of a data processing system, in accordance with many embodiments.

FIG. 8 is a simplified block diagram of a data processing system 800 that may be used in executing methods and processes described herein, in accordance with many embodiments. The data processing system 800 typically includes at least one processor 802 that communicates with one or more peripheral devices via bus subsystem 804. These peripheral devices typically include a storage subsystem 806 (memory subsystem 808 and file storage subsystem 814), a set of user interface input and output devices 818, and an interface to outside networks 816. This interface is shown schematically as "Network Interface" block 816, and is coupled to corresponding interface devices in other data processing systems via communication network interface 824. Data processing system 800 can include, for example, one or more computers, such as a personal computer, workstation, mainframe, laptop, and the like.

The user interface input devices 818 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 806 maintains the basic required programming, including computer readable media having instructions (e.g., operating instructions, etc.), and data constructs. The program modules discussed herein are typically stored in storage subsystem 806. Storage subsystem 806 typically includes memory subsystem 808 and file storage subsystem 814. Memory subsystem 808 typically includes a number of memories (e.g., RAM 810, ROM 812, etc.) including computer readable memory for storage of fixed instructions, instructions and data during program execution, basic input/output system, etc. File storage subsystem 814 provides persistent (non-volatile) storage for program and data files, and can include one or more removable or fixed drives or media, hard disk, floppy disk, CD-ROM, DVD, optical drives, and the like. One or more of the storage systems, drives, etc. may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 820 includes any means for obtaining a digital representation (e.g., images, surface topography data, etc.) of a patient's teeth (e.g., by scanning physical models of the teeth such as casts 821, by scanning impressions taken of the teeth, or by directly scanning the intraoral cavity), which can be obtained either from the patient or from treating professional, such as an orthodontist, and includes means of providing the digital representation to data processing system 800 for further processing. Scanner 820 may be located at a location remote with respect to other components of the system and can communicate image data and/or information to data processing system 800, for example, via a network interface 824. Fabrication system 822 fabricates appliances 823 based on a treatment plan, including data set information received from data processing system 800. Fabrication machine 822 can, for example, be located at a remote location and receive data set information from data processing system 800 via network interface 824.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

We claim:

1. A method comprising:
determining a treatment plan for a patient's teeth, the treatment plan comprising repositioning the patient's teeth from a first arrangement toward a second arrangement;
generating a digital model of a polymeric shell, wherein the polymeric shell comprises:
a plurality of tooth-receiving cavities shaped to receive the patient's teeth and reposition the patient's teeth from the first arrangement toward the second arrangement,
an interior layer comprising a first stiffness, and
an exterior layer comprising a second stiffness greater than the first stiffness, wherein the exterior layer comprises a discontinuity formed therein, and the discontinuity comprises a cut,
wherein, when the polymeric shell is worn on the patient's teeth, the cut is stretched by placement of the polymeric shell on the patient's teeth, the interior layer interacts with the cut by resisting the stretching, and the interaction between the interior layer and the cut imparts one or more forces to facilitate repositioning of the patient's teeth from the first arrangement toward the second arrangement;
transmitting the digital model to a fabrication system, wherein the fabrication system is configured to fabricate the polymeric shell based on the digital model; and
fabricating the polymeric shell based on the digital model.

2. The method of claim 1, wherein the fabrication system is configured to fabricate the polymeric shell using a rapid prototyping process.

3. The method of claim 1, wherein the cut extends at least partially around a protrusion formed in the exterior layer.

4. The method of claim 1, wherein the cut comprises a closed cut.

5. The method of claim 1, wherein the cut extends from a buccal surface of the exterior layer to a lingual surface of the exterior layer.

6. The method of claim 1, wherein the discontinuity comprises a plurality of cuts in the exterior layer.

7. The method of claim 1, wherein the cut defines a flap in the exterior layer and the discontinuity further comprises a plurality of perforations near a joint portion of the flap.

8. The method of claim 2, wherein the fabrication system is configured to fabricate the exterior layer from a first material having an elastic modulus within a range from 10,000 psi to 700,000 psi, and to fabricate the interior layer from a second material having an elastic modulus within a range from 100 psi to 50,000 psi.

9. The method of claim 1, wherein the discontinuity is shaped to accommodate an attachment mounted on a tooth of the patient, and the one or more forces imparted by the interaction between the interior layer and the cut are applied to the tooth via the attachment.

10. The method of claim 1, wherein the discontinuity is formed in the exterior layer to a depth that is less than a thickness of the exterior layer.

11. The method of claim 1, wherein the interior layer spans the cut.

12. The method of claim 1, wherein the stretching of the cut is configured to decrease as the patient's teeth are repositioned from the first arrangement toward the second arrangement.

13. The method of claim 1, wherein the fabricating the polymeric shell comprises using a stereolithography process.

14. A method comprising:

determining a treatment plan for a patient's teeth, the treatment plan comprising repositioning the patient's teeth from a first arrangement toward a second arrangement;

generating a digital model of an aligner configured to receive the patient's teeth and reposition the patient's teeth from the first arrangement toward the second arrangement, the aligner comprising:

a plurality of tooth-receiving cavities, an interior layer comprising a first stiffness, and an exterior layer comprising a second stiffness greater than the first stiffness, wherein the exterior layer comprises an opening formed therein, wherein, when the aligner is worn on the patient's teeth, the opening is stretched by placement of the aligner on the patient's teeth, the interior layer resists the stretching of the opening, and the resistance imparts a force to facilitate repositioning of the patient's teeth from the first arrangement toward the second arrangement;

transmitting the digital model to a fabrication system, wherein the fabrication system is configured to fabricate the aligner based on the digital model; and fabricating the aligner based on the digital model.

15. The method of claim 14, wherein the fabrication system is configured to fabricate the aligner using a rapid prototyping process.

16. The method of claim 14, wherein the opening extends at least partially around a protrusion formed in the exterior layer.

17. The method of claim 14, wherein the exterior layer comprises a plurality of openings formed therein.

18. The method of claim 14, wherein the opening defines a flap in the exterior layer and the exterior layer further comprises a plurality of perforations near a joint portion of the flap.

19. The method of claim 14, wherein the opening is shaped to accommodate an attachment mounted on a tooth of the patient, and the force imparted by the interaction between the interior layer and the opening is applied to the tooth via the attachment.

20. The method of claim 14, wherein the opening is one of a plurality of openings in the exterior layer.

21. A method comprising:

determining a treatment plan for a patient's teeth, the treatment plan comprising repositioning the patient's teeth from a first arrangement toward a second arrangement;

generating a digital model of an aligner configured to receive the patient's teeth and reposition the patient's teeth from the first arrangement toward the second arrangement, the aligner comprising:

a plurality of tooth-receiving cavities, an interior layer comprising a first stiffness, an exterior layer comprising a second stiffness greater than the first stiffness, and a deformable opening formed in the exterior layer and positioned over the interior layer such that the interior layer resists stretching of the deformable opening, wherein the resistance of the interior layer to the stretching of the deformable opening imparts a force to facilitate repositioning of the patient's teeth from the first arrangement toward the second arrangement;

and fabricating, via a fabrication system, the aligner based on the digital model.

22. The method of claim 21, wherein the fabrication system is configured to fabricate the aligner using a rapid prototyping process.

23. The method of claim 21, wherein the deformable opening extends at least partially around a protrusion formed in the exterior layer.

24. The method of claim 21, wherein the exterior layer comprises a plurality of deformable openings formed therein.

25. The method of claim 21, wherein the deformable opening defines a flap in the exterior layer and the exterior layer further comprises a plurality of perforations near a joint portion of the flap.

26. The method of claim 21, wherein the deformable opening is shaped to accommodate an attachment mounted on a tooth of the patient.

27. The method of claim 21, wherein the deformable opening comprises a deformable cut.

28. The method of claim 21, wherein the fabrication system is configured to fabricate the exterior layer from a first material having an elastic modulus within a range from 10,000 psi to 700,000 psi, and to fabricate the interior layer from a second material having an elastic modulus within a range from 100 psi to 50,000 psi.

29. The method of claim 21, wherein the deformable opening is one of a plurality of deformable openings in the exterior layer.

\* \* \* \* \*